US012679740B2

(12) United States Patent
Takai et al.

(10) Patent No.: US 12,679,740 B2
(45) Date of Patent: Jul. 14, 2026

(54) SPRAYED ARTICLE

(71) Applicant: Shin-Etsu Chemical Co., Ltd., Tokyo (JP)

(72) Inventors: Yasushi Takai, Echizen (JP); Noriaki Hamaya, Echizen (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 18/384,076

(22) Filed: Oct. 26, 2023

(65) Prior Publication Data

US 2024/0051839 A1 Feb. 15, 2024

Related U.S. Application Data

(62) Division of application No. 16/316,158, filed as application No. PCT/JP2017/025117 on Jul. 10, 2017, now Pat. No. 12,024,439.

(30) Foreign Application Priority Data

Jul. 14, 2016 (JP) ................................. 2016-139090

(51) Int. Cl.
| | |
|---|---|
| *C01F 17/259* | (2020.01) |
| *C01F 17/218* | (2020.01) |
| *C01F 17/265* | (2020.01) |
| *C23C 4/10* | (2016.01) |
| *C23C 4/134* | (2016.01) |

(52) U.S. Cl.
CPC .......... *C01F 17/259* (2020.01); *C01F 17/218* (2020.01); *C01F 17/265* (2020.01); *C23C 4/10* (2013.01); *C23C 4/134* (2016.01); *C01P 2004/61* (2013.01)

(58) Field of Classification Search
None
See application file for complete search history.

(56) References Cited

U.S. PATENT DOCUMENTS

| | | | | |
|---|---|---|---|---|
| 3,837,894 | A | * | 9/1974 | Tucker, Jr. .......... C23C 28/3455 |
| | | | | 427/454 |
| 2002/0015853 | A1 | | 2/2002 | Wataya et al. |
| 2002/0018902 | A1 | | 2/2002 | Tsukatani et al. |
| 2004/0126614 | A1 | | 7/2004 | Maeda et al. |
| 2007/0092696 | A1 | | 4/2007 | Tsukatani et al. |
| 2007/0248832 | A1 | | 10/2007 | Maeda et al. |
| 2015/0096462 | A1 | | 4/2015 | Fukagawa et al. |
| 2015/0307715 | A1 | | 10/2015 | Sato et al. |
| 2015/0321964 | A1 | | 11/2015 | Sun et al. |
| 2016/0244868 | A1 | * | 8/2016 | Ibe .......................... C04B 35/553 |
| 2016/0326623 | A1 | | 11/2016 | Nagayama et al. |
| 2017/0107604 | A1 | | 4/2017 | Ibe et al. |
| 2017/0233860 | A1 | | 8/2017 | Nagayama et al. |
| 2017/0283933 | A1 | | 10/2017 | Ibe et al. |
| 2017/0292182 | A1 | | 10/2017 | Hamaya et al. |

FOREIGN PATENT DOCUMENTS

| | | | | |
|---|---|---|---|---|
| DE | 102016002630 | A1 * | 9/2017 | ............. C23C 4/129 |
| JP | 2002-80954 | A | 3/2002 | |
| JP | 2002-115040 | A | 4/2002 | |
| JP | 2004-197181 | A | 7/2004 | |
| JP | 2007-115973 | A | 5/2007 | |
| JP | 2007-308794 | A | 11/2007 | |
| JP | 2010-150617 | A | 7/2010 | |
| JP | 2014-9361 | A | 1/2014 | |
| JP | 2015-110844 | A | 6/2015 | |
| JP | 2015-227512 | A | 12/2015 | |
| JP | 2016-65302 | A | 4/2016 | |
| JP | 2016-89241 | A | 5/2016 | |
| JP | 2016089241 | A * | 5/2016 | |
| JP | 2016-211070 | A | 12/2016 | |
| JP | 2017-78205 | A | 4/2017 | |
| JP | 2017-515001 | A | 6/2017 | |
| JP | 2017-190475 | A | 10/2017 | |
| KR | 10-2011-0118939 | A | 11/2011 | |
| WO | 2015/019673 | A1 | 2/2015 | |
| WO | 2015/171801 | A | 11/2015 | |

(Continued)

OTHER PUBLICATIONS

Ishikawa et al., JP-2016089241-A, May 23, 2016 (machine translation) (Year: 2016).*
Vassen et al.,DE-102016002630-A1, Sep. 7, 2017 (machine translation) (Year: 2017).*
International Search Report dated Aug. 1, 2017, issued in counterpart International Application No. PCT/JP2017/025117 (1 page).
Koichi Takeda, "Recent Development of Plasma Spraying", The Transactions of The Institute of Electrical Engineers of Japan (A Publication of Fundamentals and Materials Society), vol. 114-A, No. 9, Sep. 1994, pp. 572-578, with English Translation. (29 pages).
Atsushi Hasui, "Some Study of Thermal Spraying Process", Fujico Technical Report 2000 "tsukuru", No. 8, Oct. 1, 2000, pp. 10-18, with English Translation. (35 pages).

(Continued)

*Primary Examiner* — Cheng Yuan Huang
(74) *Attorney, Agent, or Firm* — WHDA, LLP

(57) ABSTRACT

A sprayed article is disclosed including a substrate and a sprayed coating deposited thereon and containing a rare earth oxyfluoride as main phase. Provided is a slurry for suspension plasma spraying, which is a spray material used for suspension plasma spraying in an atmosphere including an oxygen-containing gas, contains 5-40 mass % of rare earth fluoride particles having a maximum particle diameter (D100) of 12 μm or less, and contains one or more types of solvent selected from among water and organic solvents. A rare earth acid fluoride-containing sprayed film, in which process shift and particle generation hardly occur, can be stably formed on a base material by carrying out suspension plasma spraying in an atmosphere including an oxygen-containing gas. A spraying member provided with this sprayed film exhibits excellent corrosion resistance to halogen-based gas plasma.

11 Claims, No Drawings

(56)　　　　　　References Cited

FOREIGN PATENT DOCUMENTS

WO　　　2016/035870 A1　　3/2016

OTHER PUBLICATIONS

Kyoichi Oshida et al., "Pore Analysis of Isotropic Graphite using Image Processing of Optical Micrographs", The Journal "TANSO" published by The Carbon Society of Japan, 1996, No. 173, p. 142-147, with English Translation. (18 pages).

Projects to Support the Advancement of Strategic Core Technologies in Fiscal 2014, "Development of Dense Ceramic Membrane Manufacturing Techniques by Fine Particle Spraying for Application to Fuel Cell Electrolyte Membrane", Entruster: Kansai Bureau of Economy, Trade and Industry, Trustee: Public Interest Incorporated Foundation, The New Industry Research Organization, with English Translation. (50 pages).

Yasuhiro Yamazaki et al., "Investigation of Sample Preparation Method for Microstructural Observation of Thermal Spray Coatings", Transactions of The Japan Society of Mechanical Engineers (Edition A), vol. 79, No. 799(Mar. 2013), p. 146-150, with English Translation. (16 Pages).

Written Opposition to the Grant of Patent dated Dec. 21, 2018, issued in counterpart JP Patent No. 6347310 B1, with English translation. (60 pages).

Office Action dated Nov. 15, 2021, issued in counterpart KR Application No. 10-2019-7003930, with English Translation. (10 pages).

Ishikawa et al., JP 2016089241, May 23, 2016 (machine translation) (Year: 2016).

Office Action dated Sep. 8, 2023, issued in counterpart KR Application No. 10-2022-7036583, with English Translation. (7 pages).

* cited by examiner

SPRAYED ARTICLE

TECHNICAL FIELD

This invention generally relates to thermal spraying, and more particularly, to a suspension plasma spraying slurry, a method for forming a rare earth oxyfluoride sprayed coating using the slurry, and a sprayed article suitable as a member exposed to a halogen-base gas plasma atmosphere in the etching step of the semiconductor device fabrication process.

BACKGROUND ART

In the etching step of the semiconductor device fabrication process, treatment is carried out in a corrosive halogen-base gas plasma atmosphere. Members having sprayed coatings are known to be fully corrosion resistant in such atmosphere. For example, coatings are deposited on the surface of metallic aluminum and ceramic, typically aluminum oxide, substrates by atmospheric plasma spraying of yttrium oxide (Patent Document 1: JP-A 2002-080954 and Patent Document 2: JP-A 2007-308794) or yttrium fluoride (Patent Document 3: JP-A 2002-115040 and Patent Document 4: JP-A 2004-197181). Such sprayed articles are used in the area of an etching system or etcher which is exposed to the halogen-base gas plasma. Typical corrosive halogen-base gases used in the semiconductor device fabrication process are fluorine-base gases such as $SF_6$, $CF_4$, $CHF_3$, $ClF_3$ and HF and chlorine-base gases such as $Cl_2$, $BCl_3$ and HCl.

Yttrium oxide-deposited articles obtained by plasma spraying of yttrium oxide suffer from few technical problems and have long been utilized as semiconductor-related sprayed articles. When yttrium oxide-deposited articles are used in the etching step with fluorine gas, there arises the problem that the etching step becomes unstable because outermost surface yttrium oxide can react with a fluoride at the initial of the step, and so the fluorine gas concentration within the etching system changes. This problem is known as "process shift."

To overcome this problem, the replacement by yttrium fluoride-deposited articles is under consideration. However, yttrium fluoride tends to have slightly weak corrosion resistance in a halogen-base gas plasma atmosphere, as compared with yttrium oxide. In addition, yttrium fluoride sprayed coatings have many crevices on their surface and release many particles, as compared with yttrium oxide sprayed coatings.

So, yttrium oxyfluoride having characteristics of both yttrium oxide and yttrium fluoride draws attention as a spray material. Patent Document 5: JP-A 2014-009361 discloses an attempt to use yttrium oxyfluoride. While yttrium oxyfluoride-deposited articles are prepared by atmospheric plasma spraying of yttrium oxyfluoride as a spray material, consistent deposition of yttrium oxyfluoride as sprayed coating is difficult because oxidation gives rise to a compositional shift of fluorine depletion and oxygen enrichment, forming yttrium oxide.

Suspension plasma spraying (SPS) was developed as an alternative deposition technique to replace plasma spraying where a spray material is fed in solid form (simply referred to as "plasma spraying," hereinafter). The SPS where the spray material is fed in the form of slurry is capable of forming sprayed coatings with only a few crevices on their surface as compared with plasma spraying. It is under study to use sprayed articles prepared by SPS as members which are exposed to the halogen-base gas plasma in etching and CVD systems for semiconductor device fabrication. For example, Patent Document 6: JP-A 2010-150617 and Patent Document 7: WO 2015/019673 propose SPS of an yttrium oxide slurry material and an yttrium oxyfluoride slurry material, respectively. Even the SPS process using an yttrium oxyfluoride slurry material is still difficult to form a sprayed coating of yttrium oxyfluoride in a consistent manner as is the plasma spraying.

PRIOR ART DOCUMENTS

Patent Documents

Patent Document 1: JP-A 2002-080954
Patent Document 2: JP-A 2007-308794
Patent Document 3: JP-A 2002-115040
Patent Document 4: JP-A 2004-197181
Patent Document 5: JP-A 2014-009361
Patent Document 6: JP-A 2010-150617
Patent Document 7: WO 2015/019673

SUMMARY OF THE INVENTION

Problems to be Solved by the Invention

An object of the invention, which has been made under the above-mentioned circumstances, is to provide a suspension plasma spraying slurry which ensures consistent formation of a rare earth oxyfluoride sprayed coating by suspension plasma spraying (SPS), the rare earth oxyfluoride sprayed coating being minimized in process shift and particle release as compared with yttrium oxide sprayed coatings and yttrium fluoride sprayed coatings; a method for forming a rare earth oxyfluoride sprayed coating using the slurry; and a sprayed article prepared by suspension plasma spraying of the slurry.

Means for Solving the Problems

Making extensive investigations to solve the outstanding problems, the inventors have found that by using a slurry comprising 5% to 40% by weight of rare earth fluoride particles having a maximum particle size (D100) of up to 12 μm and one or more solvents selected from water and organic solvents, as a spray material and suspension plasma spraying the slurry in an atmosphere containing an oxygen-containing gas, a rare earth oxyfluoride-containing sprayed coating is formed in a stable manner, the sprayed coating having a minimal process shift and least particle release; and that a sprayed article having a sprayed coating formed on a substrate using the slurry and containing a rare earth oxyfluoride has improved corrosion resistance to halogen-base gas plasma.

Accordingly, the invention provides a suspension plasma spraying slurry, a method for forming a sprayed coating of rare earth oxyfluoride, and a sprayed article, as defined below.

[1] A suspension plasma spraying slurry for use as a spray material for suspension plasma spraying in an atmosphere containing an oxygen-containing gas, the slurry comprising 5 to 40% by weight of rare earth fluoride particles having a maximum particle size (D100) of up to 12 μm and at least one solvent selected from water and organic solvents.

[2] The slurry of [1], further comprising up to 3% by weight of an anti-agglomerating agent of an organic compound.

[3] The slurry of [1] or [2], further comprising up to 5% by weight of at least one microparticulate additive selected from the group consisting of rare earth oxides, rare earth hydroxides, and rare earth carbonates.

[4] The slurry of any one of [1] to [3] wherein the rare earth element is at least one element selected from the group consisting of yttrium (Y), gadolinium (Gd), holmium (Ho), erbium (Er), ytterbium (Yb), and lutetium (Lu).

[5] The slurry of any one of [1] to [4] wherein the suspension plasma spraying is atmospheric suspension plasma spraying.

[6] A method for forming a sprayed coating of rare earth oxyfluoride, comprising the step of suspension plasma spraying the slurry of any one of [1] to [4] as a spray material to a substrate in an atmosphere containing an oxygen-containing gas.

[7] The method of [6] wherein the suspension plasma spraying is atmospheric suspension plasma spraying.

[8] The method of [6] or [7] wherein the sprayed coating contains a rare earth oxyfluoride as main phase.

[9] The method of any one of [6] to [8] wherein the rare earth oxy fluoride is at least one rare earth oxyfluoride selected from the group consisting of $ReOF$, $Re_5O_4F_7$, $Re_6O_5F_8$, and $Re_7O_6F_9$ wherein Re is a rare earth element.

[10] The method of any one of [6] to [9] wherein the sprayed coating is a mixture of a rare earth oxyfluoride, a rare earth oxide, and a rare earth fluoride.

[11] A sprayed article comprising a substrate and a sprayed coating deposited thereon and containing a rare earth oxyfluoride as main phase.

[12] The sprayed article of [11] wherein the rare earth element is at least one element selected from the group consisting of yttrium (Y), gadolinium (Gd), holmium (Ho), erbium (Er), ytterbium (Yb), and lutetium (Lu).

[13] The sprayed article of [11] or [12] wherein the rare earth oxyfluoride is at least one rare earth oxyfluoride selected from the group consisting of $ReOF$, $Re_5O_4F_7$, $Re_6O_5F_8$, and $Re_7O_6F_9$ wherein Re is a rare earth element.

[14] The sprayed article of any one of [11] to [13] wherein the sprayed coating is a mixture of a rare earth oxyfluoride, a rare earth oxide, and a rare earth fluoride.

[15] The sprayed article of any one of [11] to [14] wherein the sprayed coating has a thickness of 10 μm to 150 μm.

[16] The sprayed article of any one of [11] to [15] wherein the sprayed coating has a porosity of up to 1%.

Advantageous Effects of the Invention

The suspension plasma spraying slurry of the invention ensures that a rare earth oxyfluoride-containing sprayed coating with a minimal process shift and least particle release is formed on a substrate in a stable manner by suspension plasma spraying the slurry in an atmosphere containing an oxygen-containing gas. A sprayed article having the sprayed coating has improved corrosion resistance to halogen-base gas plasma.

4

EMBODIMENT FOR CARRYING OUT THE INVENTION

Now the invention is described in detail.

The slurry of the invention is suited for suspension plasma spraying in an atmosphere containing an oxygen-containing gas, especially atmospheric suspension plasma spraying where plasma is formed in an air atmosphere. The term "atmospheric suspension plasma spraying" used herein refers to suspension plasma spraying when ambient atmospheric gas for plasma formation is air. Plasma may be formed under normal pressure such as atmospheric pressure, under applied pressure or under reduced pressure.

The SPS slurry ensures that a rare earth oxyfluoride-containing sprayed coating, especially a sprayed coating containing rare earth oxyfluoride as main phase, is formed in a stable manner by SPS in an atmosphere containing an oxygen-containing gas. When a rare earth fluoride is plasma sprayed in an air atmosphere, there is obtained a sprayed coating having an increased oxygen concentration (content) and a decreased fluorine concentration (content). As a result of oxidation of rare earth fluoride, a rare earth oxyfluoride-containing sprayed coating can be formed from the rare earth fluoride. The resulting sprayed coating has dominant characteristics of rare earth fluoride when the degree of oxidation is too low, but dominant characteristics of rare earth oxide when the degree of oxidation is too high.

In order to form a rare earth oxyfluoride-containing sprayed coating through oxidation of rare earth fluoride as described above, a slurry having rare earth fluoride particles with a volume basis maximum particle size (D100) of up to 12 μm dispersed in a solvent is fed for SPS. In the conventional plasma spraying where a spray material is fed in solid form, particles typically having an average particle size (D50) of 20 to 50 μm are fed into a plasma flame and melted therein to form a sprayed coating. If the size of particles is too small, some particles do not enter the plasma flame due to scattering. If the size of particles is too large, some particles fall down from the plasma flame and are not melted. For this reason, particles having a particle size in the above range must be used for the plasma spraying.

In the invention of SPS which is carried out in an atmosphere containing an oxygen-containing gas, such as SPS in air atmosphere (atmospheric SPS), while spray material particles or droplets of molten particles are oxidized, oxidation proceeds inward from the surface of particles or droplets. If large particles of rare earth fluoride such as those used in the conventional plasma spraying are used, the residence time of particles in the plasma must be prolonged in order to oxidize the rare earth fluoride. However, a long residence time allows particles to fall down from the plasma flame and promotes fusion of particles or droplets, which further increases the probability that particles fall down from the plasma flame. Thus, it is difficult to control the degree of oxidation and the state of spraying concurrently when large size particles are used.

In consideration of the above-discussed oxidation mechanism in an air atmosphere, this invention uses rare earth fluoride particles having a maximum particle size (D100) of up to 12 μm. By suspension plasma spraying a slurry of rare earth fluoride particles having a relatively small size and one or more solvents selected from water and organic solvents as a dispersion medium in an atmosphere containing an oxygen-containing gas, typically air atmosphere, a sprayed coating can be formed while precisely controlling a degree of oxidation so as to achieve an oxygen content which allows rare earth oxyfluoride to fully exert its properties; for example, with respect to the oxygen content of the sprayed coating referring to the oxygen content based on the starting rare earth fluoride excluding an inorganic component (for example, microparticulate additive to be described later) which is not burnt or volatilized off during passage through the plasma and constitutes the sprayed coating together with the starting rare earth fluoride (it is referred simply as "oxygen content on starting rare earth fluoride basis," hereinafter), a sprayed coating whose oxygen content is increased by at least 1% by weight (+1 percent point), specifically at least 2% by weight (+2 percent point) and up to 5% by weight (+5 percent point), specifically up to 4% by weight (+4 percent point), more specifically up to 3% by weight (+3 percent point) over the oxygen content (% by weight) of the starting rare earth fluoride particles can be formed.

Because water contributes to oxidation of fluoride, in case where the solvent contains water, for example, when the oxygen content of rare earth fluoride particles in the slurry is 2% by weight, the sprayed coating has an oxygen content of at least 3% by weight, specifically at least 4% by weight and up to 7% by weight, specifically up to 6% by weight, more specifically up to 5% by weight, expressed as oxygen content on starting rare earth fluoride basis. When the rare earth fluoride particles in the slurry contain substantially no oxygen, the sprayed coating has an oxygen content of at least 1% by weight, specifically at least 2% by weight and up to 5% by weight, specifically up to 4% by weight, more specifically up to 3% by weight, expressed as oxygen content on starting rare earth fluoride basis. Because an organic solvent has a low ratio of oxygen in the constituent elements and oxidizes in low degree, in case where the solvent contains an organic solvent alone, for example, when the oxygen content of rare earth fluoride particles in the slurry is 0.5% by weight, the sprayed coating has an oxygen content of at least 0.1% by weight, specifically at least 0.3% by weight and up to 3% by weight, specifically up to 2% by weight, more specifically up to 1% by weight, expressed as oxygen content on starting rare earth fluoride basis. On the other hand, the sprayed coating has a fluorine content of typically at least 31.6% by weight, specifically at least 33.5% by weight and up to 38% by weight, specifically up to 37% by weight, more specifically up to 35% by weight in one embodiment wherein the starting rare earth fluoride is yttrium fluoride and the slurry is free of microparticulate additive.

The rare earth fluoride particles in the slurry preferably have a maximum particle size (D100) of up to 10 μm, more preferably up to 8 μm. The lower limit of D100 is typically at least 6 μm. The rare earth fluoride particles preferably have a volume basis average particle size (D50) of at least 1 μm and up to 5 μm, more preferably up to 3 μm. When the power applied for plasma spraying (spraying power) is up to 120 kW, D50 is preferably 1 μm to 3 μm. Also the rare earth fluoride particles may have a specific surface area (BET surface area) of up to 5 m²/g, preferably up to 3 m²/g, more preferably up to 2 m²/g. A lower limit of the specific surface area (BET surface area) of the rare earth fluoride particles is at least 0.5 m²/g, preferably at least 1 m²/g, more preferably at least 1.5 m²/g. However, the lower limit does not limit the range.

The rare earth fluoride may be synthesized by any prior art well-known techniques. For example, the rare earth fluoride is prepared by mixing a rare earth oxide powder with an acidic ammonium fluoride powder in an amount of at least 1.1 equivalents relative to the rare earth oxide and firing the mixture in an oxygen-free atmosphere, typically nitrogen atmosphere at 300° C. to 800° C. for 1 to 10 hours. The rare earth fluoride may be commercially available. If necessary, the rare earth fluoride may be ground on a jet mill and classified through an air classifier or the like whereupon a fraction of particles having a preselected particle size is ready for use.

The starting rare earth fluoride may contain oxygen as long as the oxygen content is low. When the rare earth fluoride contains oxygen, it is contemplated that a part of oxygen is present as rare earth oxide or rare earth oxyfluoride. The starting rare earth fluoride used herein is mainly composed of a rare earth trifluoride, that is, rare earth trifluoride typically accounts for at least 90% by weight, preferably at least 95% by weight, more preferably at least 98% by weight, and even more preferably at least 99% by weight of the starting rare earth fluoride. In this regard, this invention is distinguished from the prior art method which starts with rare earth oxide or rare earth oxyfluoride. The starting rare earth fluoride may consist essentially of rare earth trifluoride (specifically, at least 99.9% by weight). Although the rare earth fluoride having an oxygen content of up to 10% by weight, especially up to 5% by weight is acceptable, the oxygen content of the rare earth fluoride is preferably up to 2% by weight, more preferably up to 1% by weight. The rare earth fluoride may be substantially free of oxygen (specifically, an oxygen content is of up to 0.1% by weight).

The slurry contains rare earth fluoride particles in a concentration of from 5% by weight to 40% by weight. The concentration is preferably at least 20% by weight and up to 30% by weight. If the concentration of rare earth fluoride particles in the slurry is less than 5% by weight, the spraying efficiency may be low and the rare earth fluoride may be excessively oxidized in the plasma. If the concentration of rare earth fluoride particles in the slurry is more than 40% by weight, stable droplets may not form in the plasma and the rare earth fluoride may be insufficiently oxidized in the plasma.

The solvent which constitutes the slurry as another essential component is one or more solvents selected from water and organic solvents. Water may be used alone or in admixture with an organic solvent. Organic solvent may be used alone. Water slurry is preferable for increasing oxygen content in a sprayed coating in compared with oxygen content of raw rare earth fluoride particles in a slurry, and organic solvent slurry is preferable for restricting increase oxygen content in a sprayed coating. The organic solvent may preferably be selected as appropriate in consideration of harmfulness and environmental impact, for example, from alcohols, ethers, esters, and ketones. More specifically, examples include $C_2$-$C_6$ mono- or dihydric alcohols, $C_3$-$C_8$ ethers such as ethyl cellosolve, $C_4$-$C_5$ glycol ethers such as dimethyl diglycol (DMDG), $C_4$-$C_8$ glycol esters such as ethyl cellosolve acetate and butyl cellosolve acetate, and $C_6$-$C_9$ cyclic ketones such as isophorone. Water-soluble organic solvents which are miscible with water are especially suited from the aspects of flammability and safety.

When water is used as the solvent, droplets may not be formed in a low-temperature plasma because the plasma is deprived of heat by water evaporation. When an organic solvent is used as the solvent, its combustion may add to heat. For this reason, it is advantageous from the safety aspect to use water alone when the power applied for plasma spraying (spraying power) is high, typically 100 kW or higher. It is advantageous from the above aspect to use an organic solvent alone when the spraying power is low, typically less than 100 kW, specifically less than 50 kW. A mixture of water and organic solvent may be used when the spraying power is from 50 kW to less than 100 kW.

The slurry may further contain an anti-agglomerating agent for preventing rare earth fluoride particles from agglomerating, the agent being composed of an organic compound, especially a water-soluble organic compound. Suitable anti-agglomerating agents are surfactants. Since rare earth fluoride has a positively charged zeta potential, anionic surfactants are preferred, with polyethyleneimine-based anionic surfactants and polycarboxylate polymer-based anionic surfactants being more preferred. Although anionic surfactants are preferred in the case of water-containing solvent, nonionic surfactants may be used when the solvent is an organic solvent alone. The concentration of the anti-agglomerating agent in the slurry is preferably up to 3% by weight, more preferably up to 1% by weight and preferably at least 0.01% by weight, more preferably at least 0.03% by weight.

The slurry may further contain one or more microparticulate additives selected from rare earth oxides, rare earth hydroxides, and rare earth carbonates. The microparticulate additive is effective for preventing rare earth fluoride particles from agglomerating and settling down. The microparticulate additive preferably has a volume basis average particle size (D50) which is not more than ⅟₁₀ of the D50 of the rare earth fluoride particles. The concentration of the microparticulate additive in the slurry is preferably up to 5% by weight, more preferably up to 4% by weight and preferably at least 0.1% by weight, more preferably at least 2% by weight.

The slurry may be prepared by mixing predetermined amounts of rare earth fluoride and solvent, and optional components such as anti-agglomerating agent and microparticulate additive. For mixing purpose, a resinous ball mill with resinous balls (e.g., having a diameter of at least 10 mm), for example, is preferably used in order to prevent solid components such as rare earth fluoride and microparticulate additive from being excessively ground. In this case, the mixing time may be typically 1 hour to 6 hours. The mixed slurry may be passed through a sieve of up to 500 mesh (sieve opening 25 μm), which is effective for disintegrating agglomerates and removing any contaminants.

A sprayed article is prepared by forming a sprayed coating on a substrate through suspension plasma spraying of the slurry defined above as a spray material in an atmosphere containing an oxygen-containing gas. The sprayed article is useful as a member in semiconductor fabrication equipment. This method is capable of forming a sprayed coating of rare earth oxyfluoride on a substrate.

Examples of the substrate include stainless steel, aluminum, nickel, chromium, zinc, and alloys thereof, alumina, aluminum nitride, silicon nitride, silicon carbide, and quartz glass. The substrate is selected depending on a particular application of the sprayed article. A typical choice is a substrate from which a sprayed article suitable for semiconductor fabrication equipment is obtained. The spraying atmosphere, i.e., atmosphere surrounding the plasma should be an atmosphere containing an oxygen-containing gas because the rare earth fluoride must be oxidized therein. Examples of the atmosphere containing an oxygen-containing gas include an oxygen gas atmosphere and a mixed gas atmosphere of oxygen gas and a rare gas such as argon gas and/or nitrogen gas, typically an air atmosphere. The air atmosphere may also be a mixed gas atmosphere of air and a rare gas such as argon gas and/or nitrogen gas.

The plasma gas for plasma formation is preferably a gas mixture obtained by combining at least 2 gases selected from argon, hydrogen, helium, and nitrogen gases, more preferably a gas mixture of 2 gases: argon, and nitrogen gases, a gas mixture of 3 gases: argon, hydrogen, and nitrogen gases, or a gas mixture of 4 gases: argon, hydrogen, helium, and nitrogen gases.

The spraying operation includes the steps of charging a slurry feeder with the rare earth fluoride particle-containing slurry and feeding the slurry with the aid of a carrier gas (typically argon) through a conduit (e.g., powder hose) to the nozzle of the plasma spraying gun. The conduit preferably has an inner diameter of 2 to 6 mm. A sieve of up to 500 mesh (sieve opening 25 μm) may be installed in the conduit at any position, for example, at its slurry feed inlet to prevent the conduit and the plasma spraying gun from clogging. The sieve opening is preferably set about twice as large as the maximum particle size is (D100) of rare earth fluoride particles in the slurry for feeding the slurry in a stable manner.

As the particles, i.e., rare earth fluoride particles are continuously fed by spraying the slurry in the form of droplets from a plasma spraying gun into the plasma flame, the rare earth fluoride is melted and liquefied, forming a liquid flame under the impetus of plasma jet. When the inventive slurry is used in SPS w % herein the solvent is evaporated in the plasma flame, even small particles, which cannot be melted in the conventional plasma spraying adapted to feed a spray material in solid form, can be melted. Since the slurry contains no coarse particles, droplets of uniform size are formed. As the liquid flame impinges against a substrate, molten rare earth fluoride is fused, solidified, and deposited thereon. The unmolten rare earth fluoride, the molten rare earth fluoride, and the rare earth fluoride deposited on the substrate are oxidized during respective steps into rare earth oxyfluoride(s). The rare earth oxyfluoride sprayed coating can be formed by moving the liquid flame across the substrate surface horizontally or vertically by means of an automatic machine (i.e., robot) or human arm to scan a predetermined region on the substrate surface. The sprayed coating preferably has a thickness of at least 10 μm, more preferably at least 30 μm and up to 150 μm, more preferably up to 100 μm.

In the SPS, the spraying conditions including a spray distance, current value, voltage value, gases, and gas feed rates are not particularly limited. Any prior art well-known conditions may be used. The spraying conditions may be determined as appropriate depending on the identity of substrate, the slurry of rare earth fluoride particles, a particular application of the resulting sprayed article, and the like. If desired, an undercoat, typically a rare earth oxide layer of about 50 to about 300 μm thick may be pre-formed on a substrate, for example, by atmospheric plasma spraying or atmospheric suspension plasma spraying under normal pressure before the sprayed coating of rare earth oxyfluoride is formed on the substrate.

By suspension plasma spraying of the inventive slurry, a rare earth oxyfluoride-containing sprayed coating, especially a sprayed coating containing a rare earth oxyfluoride as main phase is formed, and a sprayed article having the sprayed coating on a substrate is prepared. The rare earth oxyfluoride preferably contains one or more rare earth oxyfluorides selected from ReOF, $Re_5O_4F_7$, $Re_6O_5F_8$, and $Re_7O_6F_9$ wherein Re is a rare earth element. The sprayed coating may contain any compounds other than the rare earth oxyfluoride, for example, rare earth oxide and/or rare earth fluoride. In this case, the sprayed coating is preferably a mixture of rare earth oxyfluoride, rare earth oxide, and rare earth fluoride. The sprayed coating containing rare earth oxyfluoride as main phase is, for example, such that on X-ray diffractometry (XRD) analysis of the sprayed coating, the sum of the highest peaks of peak phases assigned to rare earth oxyfluoride is at least 50%, specifically at least 60%, based on the sum of the highest peaks of crystal phases of which the sprayed coating is composed, and preferably the highest peak is the peak assigned to rare earth oxyfluoride. The sprayed coating formed by SPS of the inventive slurry is as dense as having a porosity of up to 1% by volume, especially up to 0.5% by volume.

Rare earth elements of rare earth oxyfluorides, rare earth oxides, rare earth hydroxides and rare earth carbonates in the slurry, rare earth elements of rare earth oxyfluorides such as $ReOF$, $Re_5O_4F_7$, $Re_6O_5F_8$, and $Re_7O_6F_9$ (wherein Re is a rare earth element) of which the sprayed coating is composed, and rare earth elements of rare earth oxides and rare earth fluorides which may be included along with rare earth oxyfluorides in the sprayed coating are preferably one or more elements selected from among yttrium (Y), gadolinium (Gd), holmium (Ho), erbium (Er), ytterbium (Yb), and lutetium (Lu). The rare earth element preferably contains at least one of yttrium, gadolinium, ytterbium, and lutetium. More preferably, the rare earth element is yttrium alone or a mixture of a majority (e.g., at least 90 mol %) of yttrium and the balance of ytterbium or lutetium.

EXAMPLES

Examples and Comparative Examples are given below by way of illustration and not by way of limitation.

Examples 1 to 7 and Comparative Examples 1 and 2

[Preparation of Rare Earth Fluoride Particles and Slurry for Examples 1 to 7]

A rare earth fluoride having a rare earth compositional ratio as shown in Table 1 or 2 was prepared by mixing 1 kg of a rare earth oxide (previously prepared in the rare earth compositional ratio) with 1.2 kg of acidic ammonium fluoride powder and firing the mixture in a nitrogen atmosphere at 650° C. for 2 hours. The rare earth fluoride was ground on a jet mill and passed through an air classifier, whereby a fraction of rare earth fluoride particles having a maximum particle size (D100) as shown in Table 1 or 2 was obtained. The particle size distributions (D100 and D50) and BET specific surface area of rare earth fluoride particles are shown in Table 1 or 2. The particle size distribution of particles was measured by laser light diffractometry and the BET specific surface area of particles was measured by an automatic surface area analyzer Macsorb HM model-1280

(Mountech Co., Ltd.). (Hereafter, the same methods were applied in the measurements.) Their oxygen and fluorine concentrations (or contents) are also shown in Table 1 or 2. Particles were analyzed for oxygen concentration (or content) by an inert gas fusion infrared absorption spectroscopy using an elemental analyzer THC600 (LECO Corp.) and for fluorine concentration (or content) by dissolution ion chromatography. (Hereafter, the same methods were applied in the measurements.)

An anti-agglomerating agent and microparticulate additive (in Examples 3 to 5) in Table 1 or 2 were added to the rare earth fluoride, and a solvent in Table 1 or 2 was further added. The mixture was admitted into a nylon pot with nylon balls of diameter 15 mm where it was milled for about 2 hours. The mixture was passed through a sieve of 50) mesh (opening 25 μm), obtaining a rare earth fluoride slurry.

[Preparation of Yttrium Oxyfluoride Particles and Slurry for Comparative Example 1]

Yttrium oxyfluoride was prepared by mixing 1 kg of yttrium oxide with 1.2 kg of acidic ammonium fluoride powder and firing the mixture in a nitrogen atmosphere at 650° C. for 4 hours. The yttrium oxyfluoride was ground on a jet mill and passed through an air classifier, whereby a fraction of yttrium oxyfluoride particles having a maximum particle size (D100) as shown in Table 1 or 2 was obtained. The particle size distributions (D100 and D50) of yttrium oxyfluoride particles are shown in Table 1 or 2. Their oxygen and fluorine concentrations (or contents) are also shown in Table 1 or 2.

An anti-agglomerating agent in Table 1 or 2 was added to the yttrium oxyfluoride and a solvent in Table 1 or 2 was further added. The mixture was admitted into a nylon pot with nylon balls of diameter 15 mm where it was milled for about 2 hours. The mixture was passed through a sieve of 500 mesh (opening 25 μm), obtaining an yttrium oxyfluoride slurry.

[Preparation of Yttrium Fluoride Particles for Comparative Example 2]

Yttrium fluoride was prepared by mixing 1 kg of yttrium oxide with 1.2 kg of acidic ammonium fluoride powder and firing the mixture in a nitrogen atmosphere at 650° C. for 2 hours. The resulting yttrium fluoride was ground on a jet mill, to which polyvinyl alcohol (PVA) as a binder was added to form a slurry. The slurry was granulated by means of a spray dryer and fired in a nitrogen atmosphere at 700° C. for 4 hours, obtaining yttrium fluoride particles having a maximum particle size (D100) as shown in Table 1 or 2. The particle size distributions (D100 and D50) of yttrium fluoride particles are shown in Table 1 or 2. Their oxygen and fluorine concentrations (or contents) are also shown in Table 1 or 2.

TABLE 1

| | Example | | | | |
|---|---|---|---|---|---|
| | 1 | 2 | 3 | 4 | 5 |
| Rare earth fluoride | $(Gd_{0.9}Lu_{0.1})F_3$ | $YF_3$ | $(Y_{0.95}Yb_{0.05})F_3$ | $YF_3$ | $GdF_3$ |
| Content in slurry | 25 wt % | 30 wt % | 25 wt % | 25 wt % | 20 wt % |
| D100 (μm) | 11 | 8 | 10 | 9 | 5 |
| D50 (μm) | 3 | 1.8 | 2.4 | 3 | 1 |
| BET (m²/g) | 1.8 | 1.7 | 2.1 | 2.8 | 3.8 |
| O concentration | 0.2 wt % | 0.3 wt % | 0.8 wt % | 1.2 wt % | 1.8 wt % |
| F concentration | 27.0 wt % | 38.7 wt % | 39.0 wt % | 37.7 wt % | 24.8 wt % |
| Anti-agglomerating agent | poly-carboxylate polymer-based | polyethyl-eneimine-based anionic | polyethyl-eneimine-based anionic | poly-carboxylate polymer-based | nonionic surfactant |

TABLE 1-continued

| | Example | | | | |
| | 1 | 2 | 3 | 4 | 5 |
|---|---|---|---|---|---|
| | anionic surfactant | surfactant | surfactant | anionic surfactant | |
| Content in slurry | 0.5 wt % | 0.05 wt % | 0.5 wt % | 0.5 wt % | 1 wt % |
| Microparticulate additive | none | none | $Y_2O_3$ | $Y(OH)_3$ | $Gd_2O_3$ |
| Content in slurry | — | — | 3 wt % | 3 wt % | 3 wt % |
| D50 (μm) | — | — | 0.01 | 0.01 | 0.05 |
| Solvent | water:ethyl cellosolve = 4:1 (vol) | water | water | water:DMDG = 4:1 (vol) | isophorone |

TABLE 2

| | Example | | Comparative Example | |
| | 6 | 7 | 1 | 2 |
|---|---|---|---|---|
| Rare earth fluoride | $YF_3$ | $YF_3$ | YOF | $YF_3$ |
| Content in slurry | 30 wt % | 30 wt % | 30 wt % | — |
| D100 (μm) | 9 | 10 | 10 | 75 |
| D50 (μm) | 2.5 | 3 | 1.8 | 30 |
| BET (m²/g) | 0.8 | 0.6 | — | — |
| O concentration | 0.2 wt % | 0.5 wt % | 12.5 wt % | 0.05 wt % |
| F concentration | 38.7 wt % | 38.1 wt % | 13.3 wt % | 39.1 wt % |
| Anti-agglomerating agent | polyethyleneimine-based anionic surfactant | nonionic surfactant | polyvinyl alcohol (PVA) | none |
| Content in slurry | 0.005 wt % | 0.01 wt % | 5 wt % | — |
| Microparticulate additive | none | none | none | none |
| Content in slurry | — | — | — | — |
| D50 (μm) | — | — | — | — |
| Solvent | IPA:ethyl cellosolve = 3:1 (vol) | butanol:butyl cellosolve acetate = 2:1 (vol) | water | none |

[Formation of Sprayed Coating, and Preparation of Sprayed Article]

On an aluminum substrate, an yttrium oxide undercoat of 150 μm thick was formed by atmospheric plasma spraying. Onto the undercoated aluminum substrate, a sprayed coating having a thickness in Table 3 or 4 was formed by using the slurry in each of Examples 1 to 7 and Comparative Example 1 or particles in Comparative Example 2 and atmospheric suspension plasma spraying (Examples 1 to 5 and Comparative Example 1) or atmospheric plasma spraying (Comparative Example 2) under the conditions in Table 3 or 4. For thermal spraying, Examples 1, 4 and 5 and Comparative Example 2 used a thermal spray equipment Triplex (Oerlikon Metco AG) and Examples 2, 3, 6 and 7 and Comparative Example 1 used a thermal spray system CITS (Progressive Surface Inc.).

TABLE 3

| | Example | | | | |
| | 1 | 2 | 3 | 4 | 5 |
|---|---|---|---|---|---|
| Thermal spraying process | | | SPS | | |
| Current (A) | 440 | 440 | 440 | 440 | 480 |
| Voltage (V) | 180 | 230 | 230 | 160 | 100 |

TABLE 3-continued

| | Example | | | | |
| | 1 | 2 | 3 | 4 | 5 |
|---|---|---|---|---|---|
| Power (kW) | 79 | 101 | 101 | 70 | 48 |
| Atmosphere | air atmosphere and normal pressure | | | | |
| Plasma gas | 3 gases | 3 gases | 4 gases | 4 gases | 4 gases |
| Ar (L/min) | 80 | 150 | 50 | 50 | 100 |
| $H_2$ (L/min) | 70 | 60 | 50 | 10 | 10 |
| He (L/min) | 0 | 0 | 30 | 10 | 50 |
| $N_2$ (L/min) | 120 | 60 | 120 | 80 | 70 |
| Coating thickness (μm) | 30 | 60 | 50 | 80 | 100 |

TABLE 4

| | Example | | Comparative Example | |
| | 6 | 7 | 1 | 2 |
|---|---|---|---|---|
| Thermal spraying process | SPS | | | plasma spraying |
| Current (A) | 440 | 440 | 440 | 480 |
| Voltage (V) | 230 | 230 | 230 | 100 |
| Power (kW) | 80 | 80 | 101 | 48 |
| Atmosphere | air atmosphere and normal pressure | | | |
| Plasma gas | 2 gases | 3 gases | 4 gases | 3 gases |

TABLE 4-continued

| | Example | | Comparative Example | |
|---|---|---|---|---|
| | 6 | 7 | 1 | 2 |
| Ar (L/min) | 160 | 150 | 80 | 50 |
| H$_2$ (L/min) | 0 | 10 | 20 | 10 |
| He (L/min) | 0 | 0 | 20 | 0 |
| N$_2$ (L/min) | 60 | 50 | 80 | 10 |
| Coating thickness (μm) | 100 | 100 | 200 | 150 |

[Evaluation of Physical Properties of Sprayed Coating]

The sprayed coating was scraped off the sprayed article and analyzed by X-ray diffractometry. From the X-ray diffraction profile, phases of which each sprayed coating was composed were identified and the intensity ratio of their highest peak was determined. The sprayed coating was analyzed for oxygen and fluorine concentrations (or contents). Coatings were analyzed for oxygen concentration (or content) by an inert gas fusion infrared absorption spectroscopy using an elemental analyzer THC600 (LECO Corp.)

and for fluorine concentration (or content) b, dissolution ion chromatography. The porosity of the sprayed coating was determined by image analyzing an electron microphotograph in cross section of the coating. The surface hardness of the sprayed coating was measured by a Vickers hardness tester AVK-C1 (Mitutoyo Corp.) The results are shown in Table 5 or 6.

[Evaluation of Corrosion Resistance of Sprayed Coating]

Each sprayed article on its coating surface was masked with masking tape to define masked and unmasked (exposed) sections before it was mounted on a reactive ion plasma tester. A plasma corrosion test was performed under conditions: frequency 13.56 MHz, plasma power 1,000 W, etching gas CF$_4$ (80 vol %)+O$_2$ (20 vol %), flow rate 50 sccm, gas pressure 50 mTorr (6.7 Pa), and time 12 hours. After the test, the masking tape was stripped off. Any step formed between the exposed and masked sections due to corrosion was observed under a laser microscope. The step height was measured at 4 points, from which an average was computed to determine a height change as an index of corrosion resistance. The results are shown in Table 5 or 6.

TABLE 5

| | Example | | | | |
|---|---|---|---|---|---|
| | 1 | 2 | 3 | 4 | 5 |
| Phases detected by X-ray diffractometry and the intensity ratio of the highest peak of each phase | Gd$_5$O$_4$F$_7$ 1.1<br>GdOF 0.2<br>GdF$_3$ 0.6<br>Gd$_2$O$_3$ 0.2 | Y$_5$O$_4$F$_7$ 0.9<br>YOF 0.2<br>YF$_3$ 0.4<br>Y$_2$O$_3$ 0.2 | Y$_5$O$_4$F$_7$ 0.6<br>YOF 0.8<br>YF$_3$ 0.3<br>Y$_2$O$_3$ 0.4 | Y$_6$O$_5$F$_8$ 0.4<br>YOF 0.8<br>YF$_3$ 0.2<br>Y$_2$O$_3$ 0.2 | Gd$_5$O$_4$F$_7$ 0.4<br>GdOF 0.8<br>GdF$_3$ 0.2<br>Gd$_2$O$_3$ 0.5 |
| O concentration | 2 wt % | 3 wt % | 6 wt % | 8 wt % | 10 wt % |
| F concentration | 21 wt % | 33 wt % | 26 wt % | 23 wt % | 7 wt % |
| Porosity (vol %) | 0.5 | 0.2 | 0.2 | 0.6 | 0.8 |
| Vickers hardness Hv | 400 | 420 | 380 | 380 | 360 |
| Height change (μm) | 4 | 3 | 2 | 6 | 7 |

TABLE 6

| | Example | | Comparative Example | |
|---|---|---|---|---|
| | 6 | 7 | 1 | 2 |
| Phases detected by X-ray diffractometry and the intensity ratio of the highest peak of each phase | Y$_5$O$_4$F$_7$ 0.6<br>YOF 0<br>YF$_3$ 0.5 | Y$_6$O$_5$F$_8$ 0.8<br>YOF 0<br>YF$_3$ 0.4 | YOF 0.2<br>Y$_2$O$_3$ 0.8 | YF$_3$ 0.8 |
| O concentration | 0.7 wt % | 1 wt % | 15 wt % | 0.2 wt % |
| F concentration | 37.5 wt % | 36.6 wt % | 8 wt % | 38.9 wt % |
| Porosity (vol %) | 0.3 | 0.3 | 1 | 3 |
| Vickers hardness Hv | 420 | 390 | 185 | 250 |
| Height change (μm) | 1 | 3 | 25 | 15 |

In Examples 1 to 7, sprayed coatings were formed by atmospheric SPS of the slurry of rare earth fluoride particles having a maximum particle size (D100) of up to 12 μm. The rare earth fluoride particles were oxidized during thermal spraying, and a rare earth oxyfluoride coating was eventually formed. The sprayed coatings contained rare earth oxyfluorides as the main phase. It is demonstrated that the sprayed coating is a dense coating having a low porosity, high hardness and corrosion resistance. Sprayed coatings in Examples 1 to 5 which are used water slurry have comparatively increased oxygen content, and Sprayed coatings in Examples 6 to 7 which are used organic solvent slurry show limited increase of oxygen content.

The invention claimed is:

1. A sprayed article comprising a substrate and a sprayed coating deposited thereon and containing, as main phase, a crystal phase of at least one rare earth oxyfluoride selected from the group consisting of $ResO_4F_7$ and $Re_6O_5F_8$ wherein Re is a rare earth element, wherein the sprayed coating has a Vickers hardness of 390 or more.

2. The sprayed article of claim 1 wherein the rare earth element is at least one element selected from the group consisting of yttrium (Y), gadolinium (Gd), holmium (Ho), erbium (Er), ytterbium (Yb), and lutetium (Lu).

3. The sprayed article of claim 1 wherein the sprayed coating is a mixture of a rare earth oxyfluoride, a rare earth oxide, and a rare earth fluoride.

4. The sprayed article of claim 1 wherein the sprayed coating has a thickness of 10 mm to 150 mm.

5. The sprayed article of claim 1 wherein the sprayed coating has a porosity of up to 1%.

6. The sprayed article of claim 1 wherein, on X-ray diffractometry (XRD) analysis of the sprayed coating, the sum of the highest peaks of crystal phases assigned to the rare earth oxyfluoride is at least 50% based on the sum of the highest peaks of crystal phases of which the sprayed coating is composed.

7. The sprayed article of claim 1 wherein, on X-ray diffractometry (XRD) analysis of the sprayed coating, the highest peak is a peak assigned to the rare earth oxyfluoride.

8. The sprayed article of claim 1 wherein the sprayed coating further contains a rare earth fluoride.

9. The sprayed article of claim 1 wherein the sprayed coating is formed by atmospheric suspension plasma spraying with feeding a slurry having rare earth fluoride particles with a volume basis maximum particle size (D100) of up to 12 μm dispersed in a solvent.

10. The sprayed article of claim 1 including an undercoat pre-formed on the substrate.

11. The sprayed article of claim 10 wherein the undercoat is a rare earth oxide layer of 50 to 300 μm thick.

* * * * *